(12) United States Patent
Tsai

(10) Patent No.: US 6,496,365 B2
(45) Date of Patent: Dec. 17, 2002

(54) INPUT APPARATUS FOR WIRELESS COMMUNICATIONS WITH A PORTABLE COMPUTERIZED APPARATUS

(76) Inventor: Huo-Lu Tsai, No. 126-1, Shui-Nan Rd., Pei-Tun Dist., Taichung City (TW)

( * ) Notice: Subject to any disclaimer, the term of this patent is extended or adjusted under 35 U.S.C. 154(b) by 46 days.

(21) Appl. No.: 09/833,678

(22) Filed: Apr. 13, 2001

(65) Prior Publication Data

US 2002/0149908 A1 Oct. 17, 2002

(51) Int. Cl.[7] ............................... H05K 5/00; G06F 1/16
(52) U.S. Cl. ..................... 361/686; 361/680; 361/683; 312/223.1; 345/169
(58) Field of Search ..................... 361/679, 680, 361/683, 724–727, 728, 796, 801; 235/145 R, 146; 312/223.1, 223.4; 345/168, 169

(56) References Cited

U.S. PATENT DOCUMENTS

| | | | | |
|---|---|---|---|---|
| 5,347,630 A | * | 9/1994 | Ishizawa et al. | 345/538 |
| 6,049,450 A | * | 4/2000 | Cho et al. | 345/169 |
| 6,053,410 A | * | 4/2000 | Wike et al. | 235/462.43 |
| 6,108,200 A | * | 8/2000 | Fullerton | 235/145 R |
| 6,421,235 B2 | * | 7/2002 | Ditzik et al. | 320/114 |

* cited by examiner

Primary Examiner—Jayprakash N. Gandhi
(74) Attorney, Agent, or Firm—Finnegan, Henderson, Farabow, Garrett & Dunner, L.L.P.

(57) ABSTRACT

An input apparatus is adapted to communicate wirelessly with a portable computerized apparatus that has a wireless communications device. The input apparatus includes a wireless communications unit adapted to establish wireless communication between a keyboard module and the wireless communications device, a computerized apparatus support member coupled to the keyboard module and adapted to support the portable computerized apparatus, and a communications unit support member having a lower section coupled to the keyboard module and an upper section mounted with the wireless communications unit.

15 Claims, 9 Drawing Sheets

INPUT APPARATUS FOR WIRELESS COMMUNICATIONS WITH A PORTABLE COMPUTERIZED APPARATUS

BACKGROUND OF THE INVENTION

1. Field of the Invention

The invention relates to an input apparatus, more particularly to an input apparatus adapted to communicate wirelessly with a portable computerized apparatus.

2. Description of the Related Art

FIGS. 1 and 2 illustrate a conventional handheld computer keyboard system, as proposed in U.S. Pat. No. 6,108,200, that includes a keyboard portion 1, a cover portion 2 and an interface assembly 3. The keyboard portion 1 has a top surface 101 provided with a plurality of keys 103, and a bottom surface 102. The keyboard portion 1 further has a stabilizing leg 4 mounted retractably thereto at the bottom surface 102. The cover portion 2 is pivotally connected to the keyboard portion 1, and has an inner surface 201, and an outer surface 202 opposite to the inner surface 201. The cover portion 2 is operable so as to move from a closed position, where the inner surface 201 overlies the top surface 101 of the keyboard portion 1, to an opened position, where the cover portion 2 forms an angle with the top surface 101. The interface assembly 3 is mounted on the inner surface 201 of the cover portion 2, and includes an input/output connector 301 to be connected to an input/output port 501 of a computerized apparatus 5, such as a personal digital assistant or a mobile telephone, that is supported by the cover portion 2 when the latter is at the opened position.

Since the interface assembly 3 is mounted on the cover portion 2, and since the space between the input/output connector 301 and the inner surface 201 is fixed, the conventional keyboard system cannot be adapted for use with another computerized apparatus of a different thickness.

There is available in the art, a computer keyboard that is designed to communicate wirelessly with a computer main module. However, the computer keyboard as such is not designed to serve as an input apparatus for a personal digital assistant.

SUMMARY OF THE INVENTION

Therefore, the object of the present invention is to provide an input apparatus adapted to communicate wirelessly with a portable computerized apparatus.

According to the present invention, an input apparatus is adapted to communicate wirelessly with a portable computerized apparatus having top, bottom, left, right and rear portions. The top portion of the portable computerized apparatus is provided with a wireless communications device. The input apparatus comprises:

a keyboard module having front and rear ends, a bottom surface, and a top surface provided with a plurality of keys thereon;

a wireless communications unit coupled electrically to the keyboard module and adapted to establish wireless communication between the keyboard module and the wireless communications device of the portable computerized apparatus;

a computerized apparatus support member coupled to the rear end of the keyboard module and adapted to support the rear and bottom portions of the portable computerized apparatus such that the portable computerized apparatus forms an angle greater than 90 degrees with respect to the top surface of the keyboard module; and a communications unit support member having a lower section coupled to the keyboard module and an upper section mounted with the wireless communications unit, the upper section of the communications unit support member being adapted to extend beyond the top portion of the portable computerized apparatus when the portable computerized apparatus is supported on the computerized apparatus support member so as to dispose the wireless communications unit proximate to the wireless communications device.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
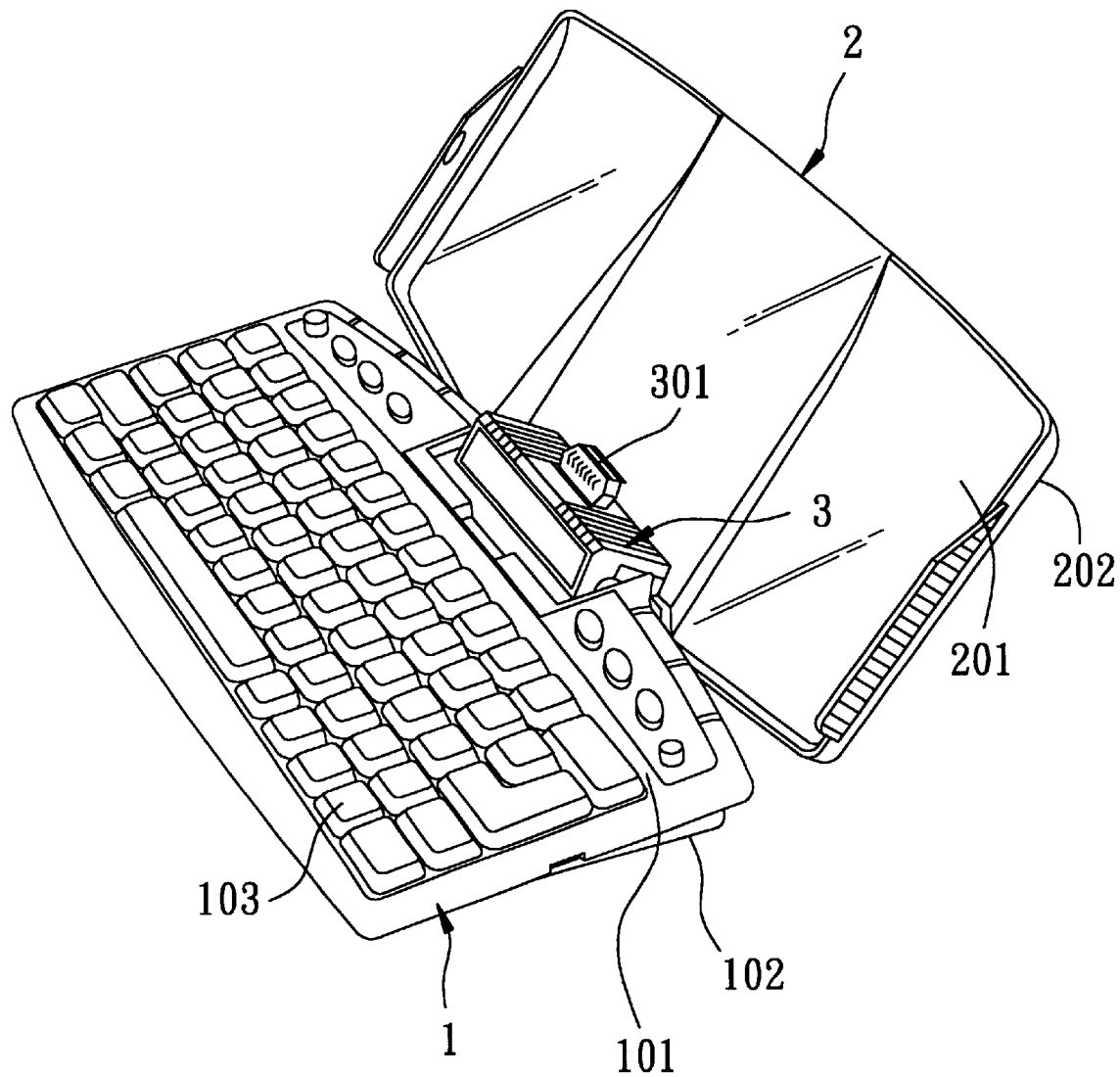
FIG. 1 is a perspective view of a conventional handheld computer keyboard system with a cover portion thereof in an opened position.
Figure 2:
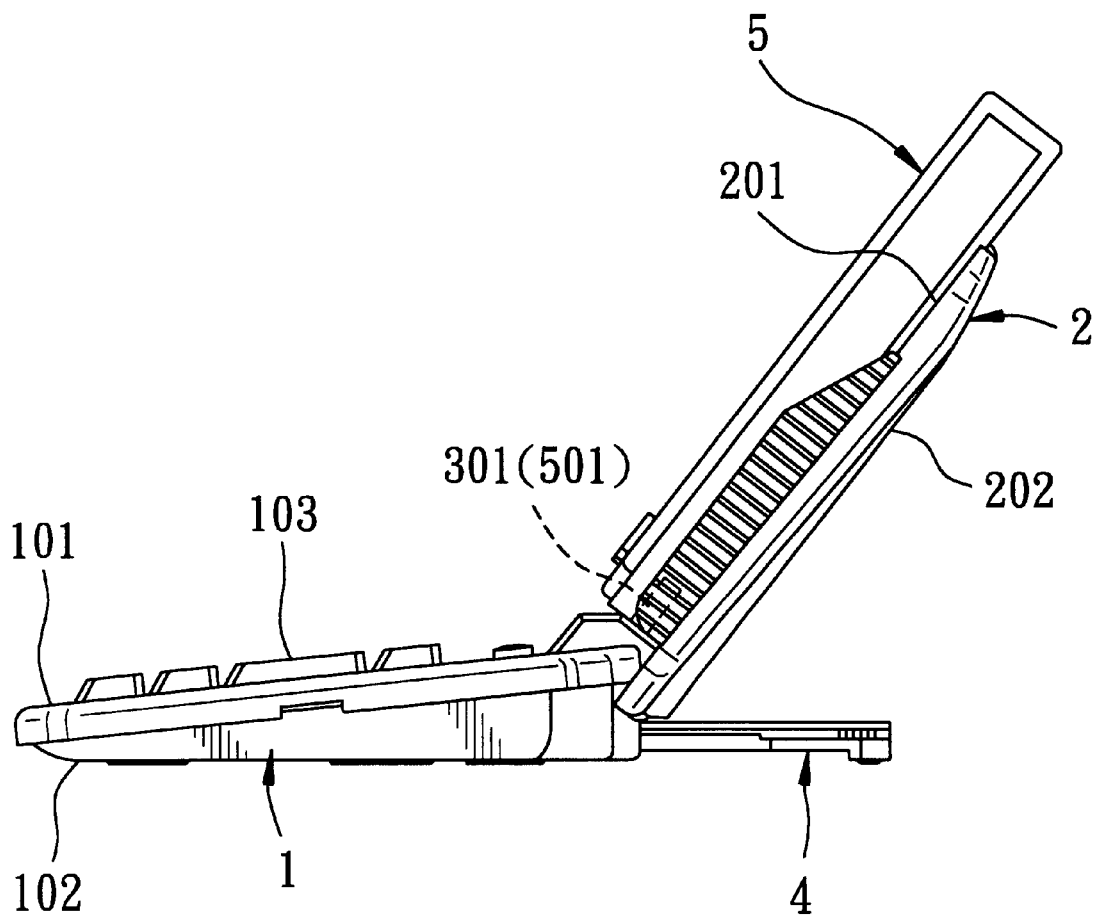
FIG. 2 is a side view of the conventional handheld computer keyboard system, with a personal digital assistant engaging an interface assembly of the keyboard system.
Figure 3:
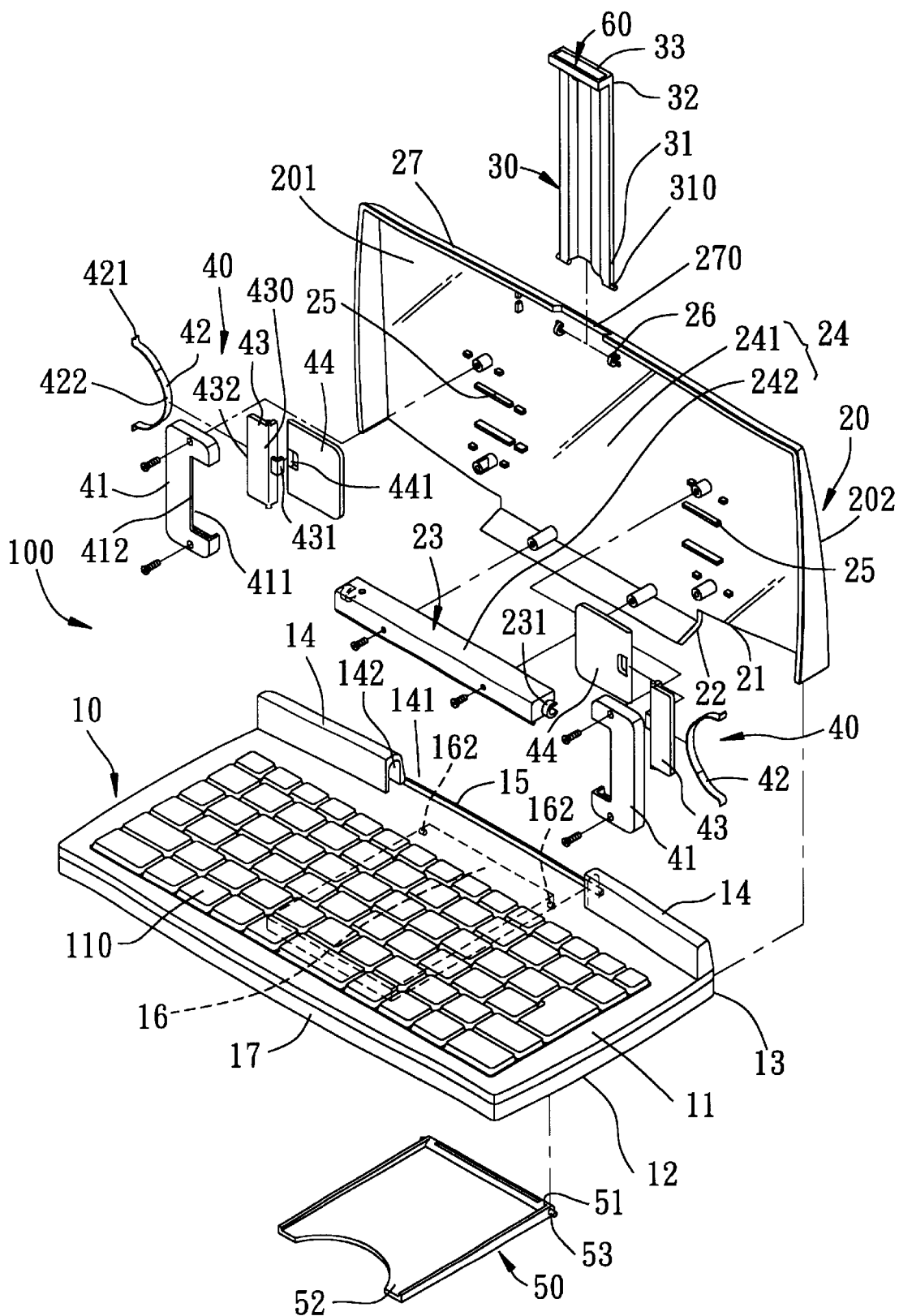
FIG. 3 is an exploded perspective view of the preferred embodiment of an input apparatus according to this invention.
Figure 4:
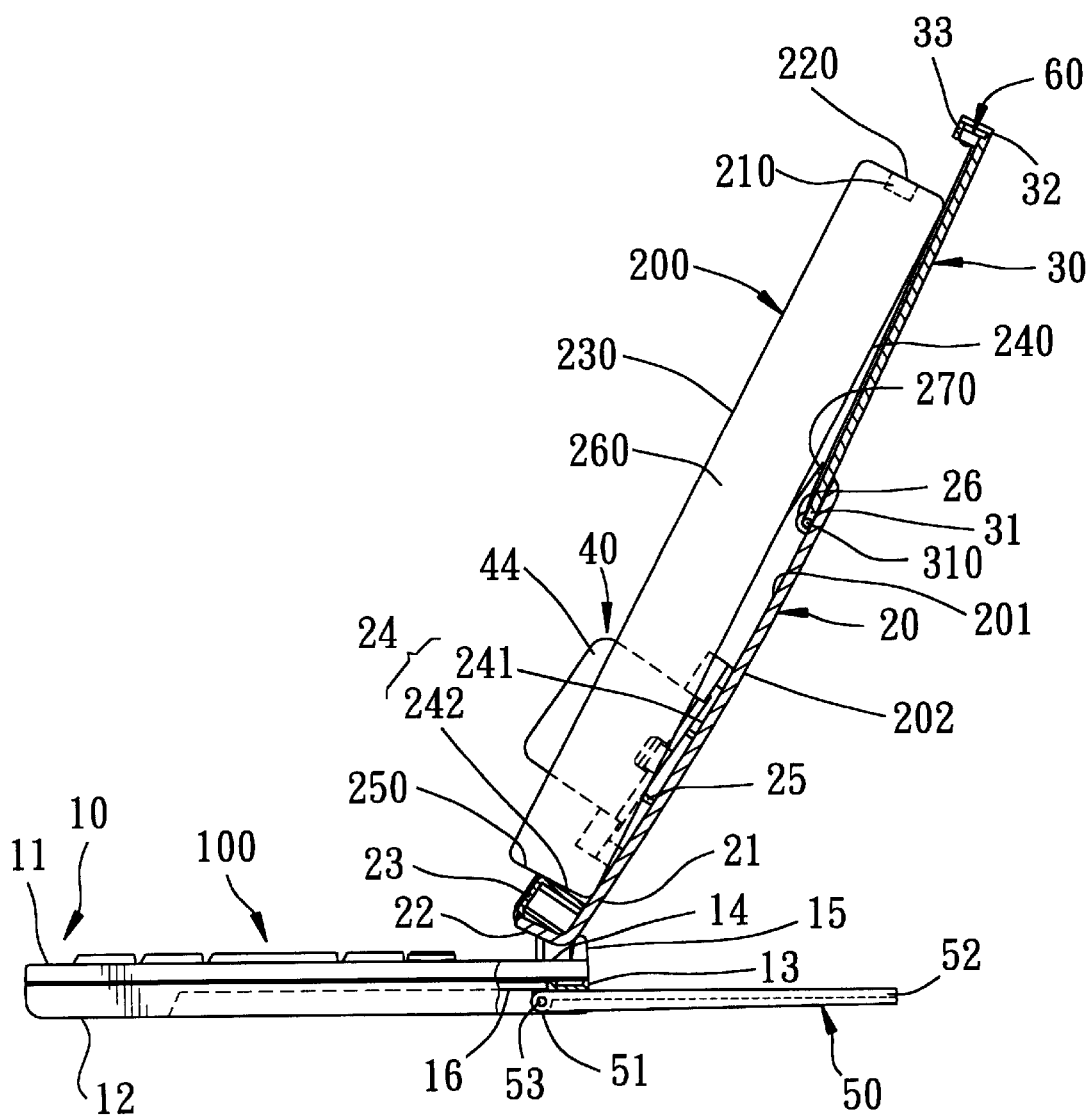
FIG. 4 is a partly sectional side view of the preferred embodiment when a plate member of a computerized apparatus support member thereof is at an opened position, and with a personal digital assistant supported on the support member.

Referring to FIGS. 3 and 4, according to the preferred embodiment of the present invention, an input apparatus 100 is adapted to communicate wirelessly with a portable computerized apparatus 200, such as a personal digital assistant or a mobile telephone, and is shown to include a keyboard module 10, a wireless communications unit 60, a plate member 20, a computerized apparatus support member 24, a communications unit support member, releasable clamping means, and a stabilizing unit. As best shown in FIG. 4, the portable computerized apparatus 200 has top, bottom, left, right, front and rear portions 220, 250, 260, 260, 230, 240. The top portion 220 of the portable computerized apparatus 200 is provided with a wireless communications device 210.

The keyboard module 10 has front and rear ends 17, 13, a bottom surface 12, and a top surface 11 provided with a plurality of keys 110 thereon. The top surface 11 has opposite pivot seats 14 provided thereon adjacent to the rear end 17. Each of the pivot seats 14 is formed with a pivot hole 142. A pivot groove 141 is formed between the pivot seats 14.

The wireless communications unit 60 is coupled electrically to the keyboard module 10 and is adapted to establish wireless communication between the keyboard module 10 and the wireless communications device 210 of the portable computerized apparatus 200.

Figure 10:
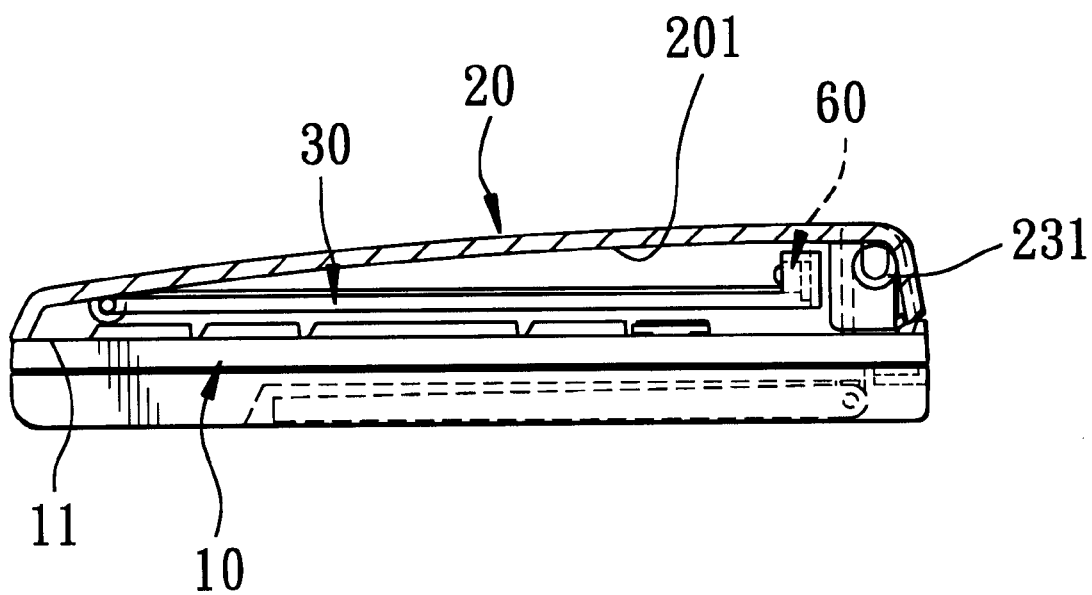
FIG. 10 is a partly sectional side view of the preferred embodiment when the plate member is at a closed position.

The plate member 20 has a rear end 21, a front end 27 opposite to the rear end 21, an inner surface 201, and an outer surface 202 opposite to the inner surface 201. The rear end 21 has an extending portion 22. A pivot block 23 is connected threadedly to the rear end 21 and is disposed on the extending portion 22. The pivot block 23 has opposite pivot axles 231 extending laterally from left and right sides thereof, respectively. The pivot block 23 is received in the pivot groove 141, and the pivot axles 231 are coupled pivotally in the pivot holes 142 of the pivot seats 14, respectively. As such, the rear end 21 of the plate member 20 is connected pivotally to the rear end 13 of the keyboard module 10, thereby permitting movement of the plate member 20 relative to the keyboard module 10 between a closed position, where the inner surface 201 of the plate member 20 overlies the top surface 11 of the keyboard module 10 (see FIG. 10), and an opened position, where the inner surface 201 of the plate member 20 forms an angle greater than 90 degrees with respect to the top surface 11 of the keyboard module 10 (see FIG. 4). A stop member 15 is provided on the top surface 11 of the keyboard module 10 adjacent to the rear end 113 of the keyboard module 10. The stop member 15 abuts against the outer surface 202 of the plate member 20 adjacent to the rear end 21 of the plate member 20 for limiting pivoting movement of the plate member 20 at the opened position, as best shown in FIG. 4.

The computerized apparatus support member 24 is coupled to the rear end 13 of the keyboard module 10 and is adapted to support the rear and bottom portions 240, 250 of the portable computerized apparatus 200. The computerized apparatus support member 24 includes a first support face 241 adapted to support the rear portion 240 of the portable computerized apparatus 200, and a second support face 242 adapted to support the bottom portion 250 of the portable computerized apparatus 200. In this embodiment, the first support face 241 is formed on the inner surface 201 of the plate member 20, whereas the second support face 242 is formed on the pivot block 23 on the rear end 21 of the plate member 20. Thus, the portable computerized apparatus 200 can form the angle greater than 90 degrees with respect to the top surface 11 of the keyboard module 10 when the portable computerized apparatus 200 is supported by the computerized apparatus support member 24.

Figure 5:
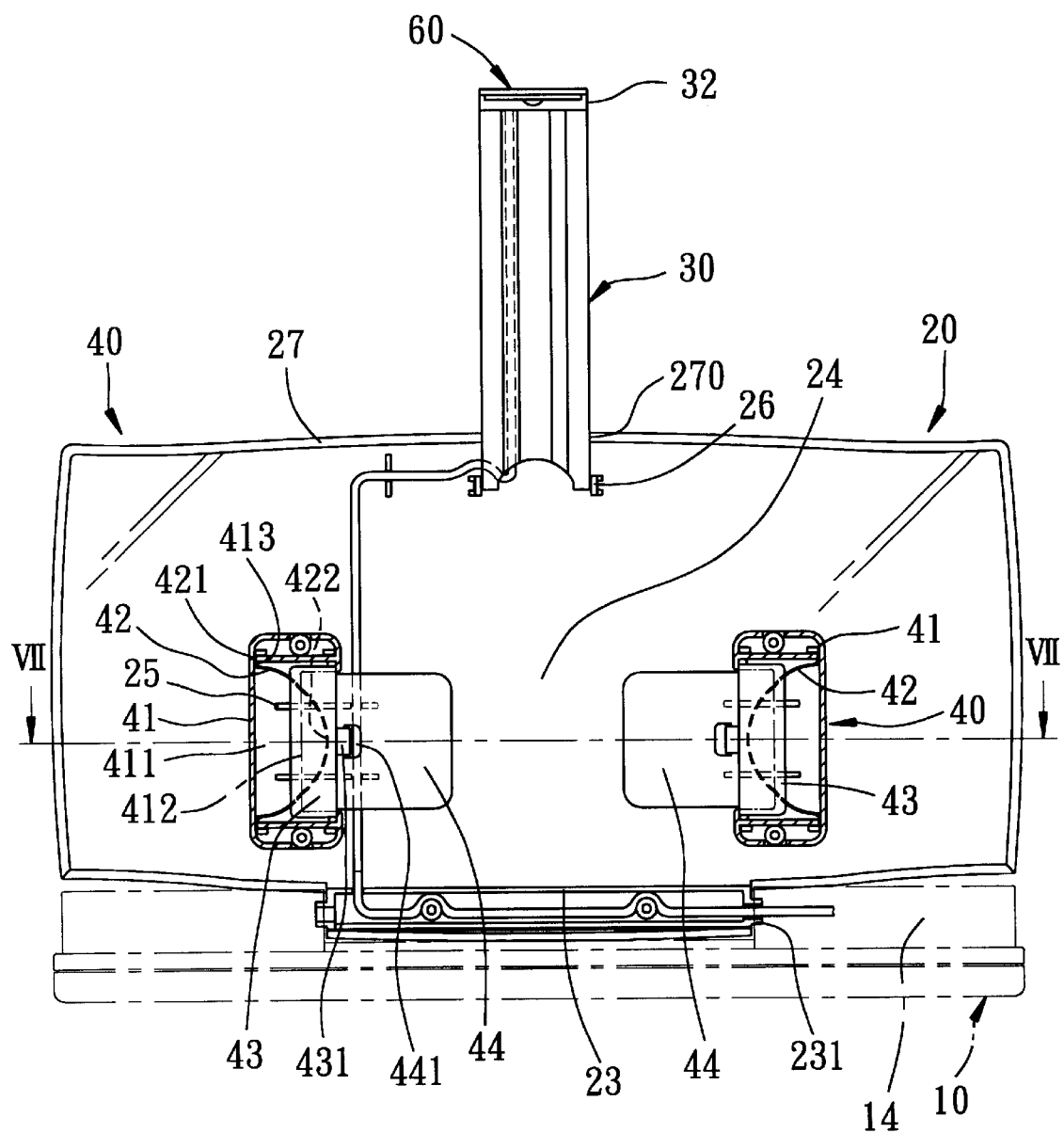
FIG. 5 is a partly sectional front view of the preferred embodiment when the plate member is at the opened position.

In this embodiment, as shown in FIGS. 4 and 5, the communications unit support member is provided on the plate member 20, and includes a mounting plate 30 formed with upper and lower sections 32, 31. The upper section 32 is mounted with the wireless communications unit 60. The inner surface 210 of the plate member 20 is formed with a pair of pivot lugs 26 adjacent to the front end 27 of the plate member 20. The lower section 31 of the mounting plate 30 has opposite pivot pins 310 coupled pivotally to the pivot lugs 26, respectively, such that the lower section 31 is mounted pivotally on the inner surface 201 of the plate member 20 so as to connect the mounting plate 30 to the keyboard module 10. Therefore, the mounting plate 30 is pivotable between a retracted position, where the upper section 32 does not extend beyond the front end 27 of the plate member 20, and an extended position, where the upper section 32 extends beyond the front end 27 of the plate member 20 via a notch 270 formed in the latter. As such, the upper section 32 is adapted to extend beyond the top portion 220 of the portable computerized apparatus 200 at the extended position when the portable computerized apparatus 200 is supported on the computerized apparatus support member 24 so as to dispose the wireless communications unit 60 proximate to the wireless communications device 210.

Figure 7:
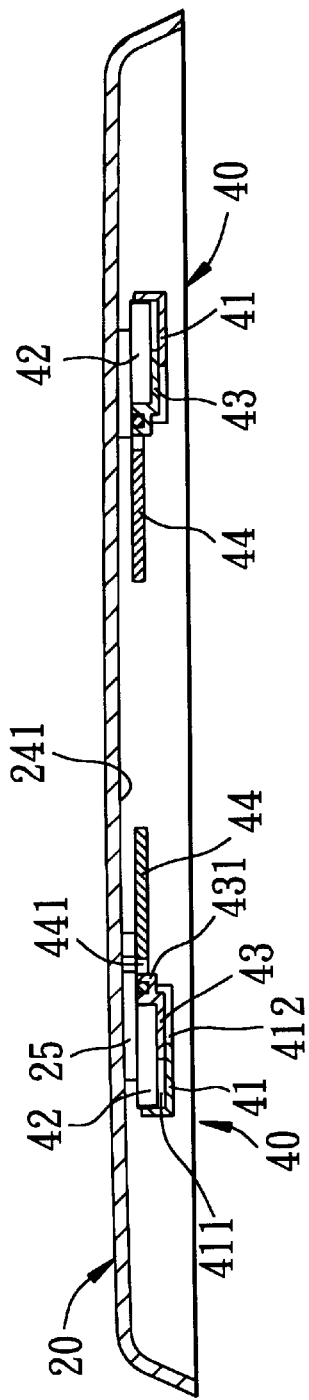
FIG. 7 is a sectional schematic view of FIG. 5 taken along line VII—VII.
Figure 8:
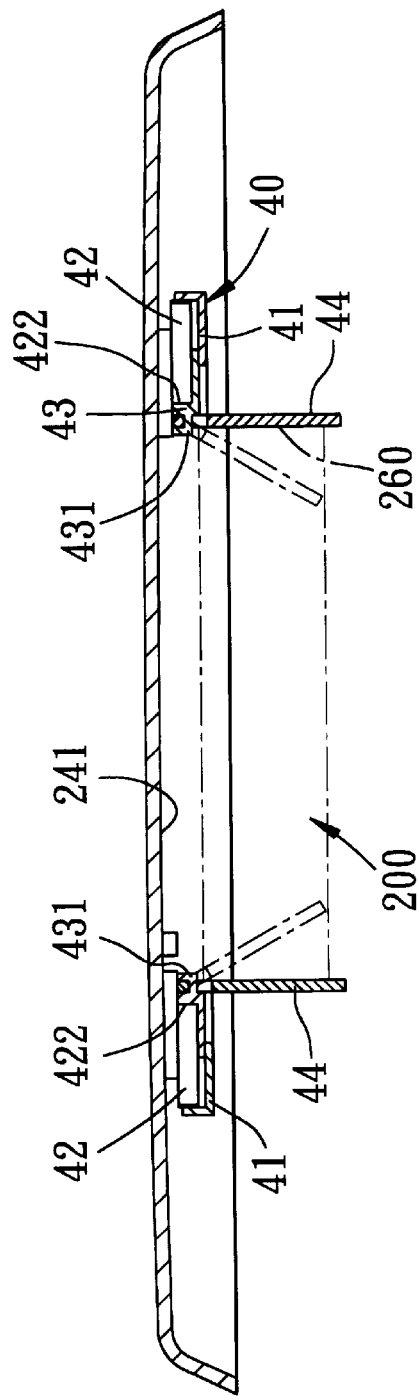
FIG. 8 is a sectional schematic view of releasable clamping means of the preferred embodiment in a state of use.
Figure 9:
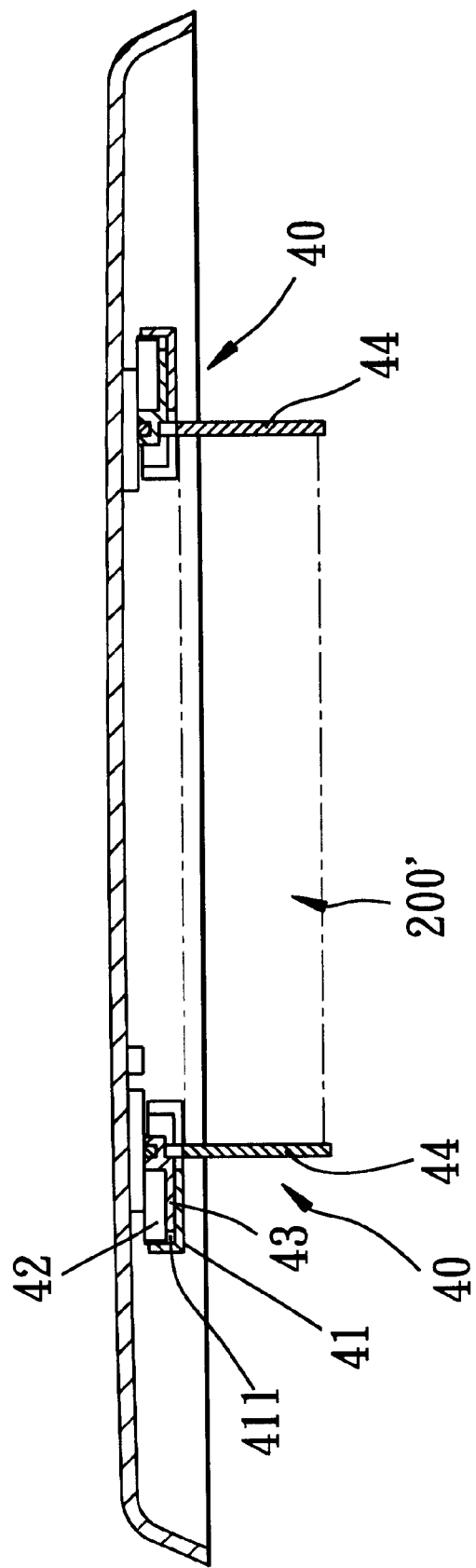
FIG. 9 is a sectional schematic view of the releasable clamping means of the preferred embodiment in another state of use.

The releasable clamping means is disposed on the first support face 241 for clamping releasably the left and right portions 260 of the portable computerized apparatus 200 when the portable computerized apparatus 200 is supported by the computerized apparatus support member 24. Referring to FIGS. 5 and 7, the releasable clamping means includes a pair of clamping unit 40, each of which includes a shell body 41, a slide body 43, a spring member 42 and a clamping plate 44. The shell body 41 is mounted securely on the first support face 241 adjacent to support blocks 25 on the first support face 241 by means of screw fasteners, and cooperates with the first support face 241 to define a horizontal slide groove 411 and an opening 412 for access into the slide groove 411. The opening 412 confronts the other one of the clamping units 40. The slide body 43 has a first portion 432 slidably retained in the slide groove 411, and a second portion 430 opposite to the first portion 432. The spring member 42, which is as an arcuate metal spring, is disposed in the shell body 41. The spring member 42 has opposite end portions 421 engaged in a pair of engaging clearances 413 formed in the shell body 41, and an arched biasing portion 422 formed between the end portions 421 for biasing the slide body 43 such that the second portion 430 extends out of the opening 412. A pivot lug 431, which is formed on the second portion 430, is connected pivotally to a pivot hole 441 of the clamping plate 44 such that the clamping plate 44 is connected pivotally to the second portion 430 of the slide body 43. The clamping plate 44 is pivotable between a first state, where the clamping plate 44 lies parallel to the first support face 241 (see FIG. 7), and a second state, where the clamping plate 44 extends transverse to the first support face 241 (see FIG. 8). It is noted that the slide bodies 43 can be adjusted to change the distance between the clamping plates 44 so as to fit another portable computerized apparatus 200' with a different size (see FIG. 9).

Figure 6:
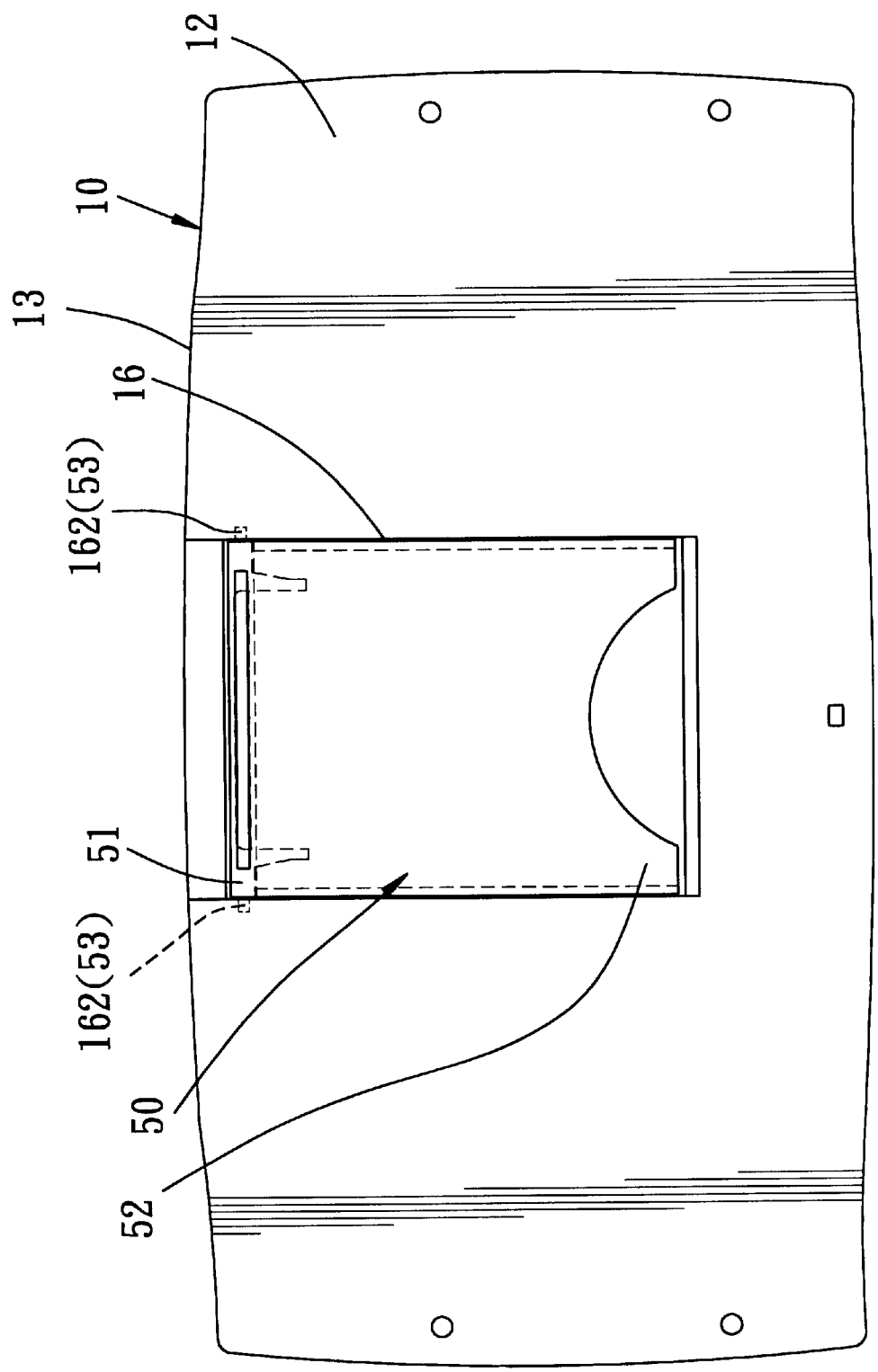
FIG. 6 is a schematic bottom view of the preferred embodiment.

The stabilizing unit is mounted on the keyboard module 10 to resist overturning of the input apparatus 100 when the portable computerized apparatus 200 is disposed on the computerized apparatus support member 24. Referring to FIGS. 4 and 6, the bottom surface 12 of the keyboard module 10 is formed with a receiving groove 16 that opens to the rear end 13 of the keyboard module 10. The stabilizing unit includes a support frame 50 disposed in the receiving groove 16. The support frame 50 has a pivot end portion 51, and an operating end portion 52 opposite to the pivot end portion. The pivot end portion 51 is formed with opposite pivot pins 53 that are coupled pivotally in opposite pivot holes 162, respectively, such that the support frame 50 is pivotable between a first position, where the support frame 50 is concealed in the receiving groove 16 (see FIG. 6), and a second position, where the support frame 50 extends out of the receiving groove 16 and projects relative to the rear end 13 of the keyboard module 10 (see FIG. 4). Therefore, the support frame 50 is pivoted by an angle of substantially 180 degrees from the bottom surface 12 of the keyboard module 10 when moved from the first position to the second position.

It is noted that even if the plate member 20 is omitted, the portable computerized apparatus 200 can be supported by the computerized apparatus support member that is provided with a supporting seat formed on the top surface 11 of the keyboard module 10 adjacent to the rear end 13, and the wireless communications unit 60 can be positioned by the communications unit support member that has the mounting plate provided on the rear end 13 of the keyboard module 10. Alternatively, when the plate member 20 is large enough to position the wireless communications unit 60 beyond the top portion 220 of the portable computerized apparatus 200, the mounting plate 30 can be omitted.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. An input apparatus adapted to communicate wirelessly with a portable computerized apparatus having top, bottom, left, right and rear portions, the top portion of the portable computerized apparatus being provided with a wireless communications device, said input apparatus comprising:

a keyboard module having front and rear ends, a bottom surface, and a top surface provided with a plurality of keys thereon;

a wireless communications unit coupled electrically to said keyboard module and adapted to establish wireless communication between said keyboard module and the wireless communications device of the portable computerized apparatus;

a computerized apparatus support member coupled to said rear end of said keyboard module and adapted to support the rear and bottom portions of the portable computerized apparatus such that the portable computerized apparatus forms an angle greater than 90 degrees with respect to said top surface of said keyboard module; and a communications unit support member having a lower section coupled to said keyboard module and an upper section mounted with said wireless communications unit, said upper section of said communications unit support member being adapted to extend beyond the top portion of the portable computerized apparatus when the portable computerized apparatus is supported on said computerized apparatus support member so as to dispose said wireless communications unit proximate to the wireless communications device.

2. The input apparatus of claim 1, wherein said computerized apparatus support member includes a first support face adapted to support the rear portion of the portable computerized apparatus, and a second support face adapted to support the bottom portion of the portable computerized apparatus.

3. The input apparatus of claim 2, further comprising a plate member having a rear end connected to said rear end of said keyboard module, a front end opposite to said rear end, an inner surface, and an outer surface opposite to said inner surface, said first support face being formed on said inner surface of said plate member, said second support face being formed on said rear end of said plate member.

4. The input apparatus of claim 3, wherein said rear end of said plate member is connected pivotally to said rear end of said keyboard module such that said plate member is movable relative to said keyboard module between a closed position, where said inner surface of said plate member overlies said top surface of said keyboard module, and an opened position, where said inner surface of said plate member forms the angle greater than 90 degrees with respect to said top surface of said keyboard module.

5. The input apparatus of claim 4, further comprising a stop member provided on said top surface of said keyboard module adjacent to said rear end of said keyboard module, said stop member abutting against said outer surface of said plate member adjacent to said rear end of said plate member for limiting pivoting movement of said plate member at the opened position.

6. The input apparatus of claim 3, wherein said communications unit support member is provided on said plate member.

7. The input apparatus of claim 6, wherein said communications unit support member includes a mounting plate formed with said upper and lower sections, said lower section being mounted on said inner surface of said plate member so as to connect said mounting plate to said keyboard module.

8. The input apparatus of claim 7, wherein said lower section is mounted movably on said plate member such that said mounting plate is movable between a retracted position, where said upper section does not extend beyond said front end of said plate member, and an extended position, where said upper section extends beyond said front end of said plate member.

9. The input apparatus of claim 8, wherein said lower section is mounted pivotally on said plate member such that said mounting plate is pivotable between the retracted and extended positions.

10. The input apparatus of claim 2, further comprising releasable clamping means disposed on said first support face for clamping releasably the left and right portions of the portable computerized apparatus when the portable computerized apparatus is supported by said computerized apparatus support member.

11. The input apparatus of claim 10, wherein said releasable clamping means includes a pair of clamping units, each of which includes:

a shell body mounted on said first support face and cooperating with said first support face to confine a horizontal slide groove and an opening for access into said slide groove, said opening confronting the other one of said clamping units;

a slide body having a first portion slidably retained in said slide groove, and a second portion opposite to said first portion; and a spring member disposed in said shell body and biasing said slide body such that said second portion extends out of said opening.

12. The input apparatus of claim 11, wherein each of said clamping units further includes a clamping plate connected pivotally to said second portion of said slide body and pivotable between a first state, where said clamping plate lies parallel to said first support face, and a second state, where said clamping plate extends transverse to said first support face.

13. The input apparatus of claim 1, further comprising a stabilizing unit mounted on said keyboard module to resist overturning of said input apparatus when the portable computerized apparatus is disposed on said computerized apparatus support member.

14. The input apparatus of claim 13, wherein said bottom surface of said keyboard module is formed with a receiving groove that opens to said rear end of said keyboard module, said stabilizing unit including a support frame disposed in said receiving groove and movable between a first position, where said support frame is concealed in said receiving groove, and a second position, where said support frame extends out of said receiving groove and projects relative to said rear end of said keyboard module.

15. The input apparatus of claim 14, wherein said support frame has a pivot end portion coupled pivotally to said keyboard module such that said support frame is pivoted by an angle of substantially 180 degrees from said bottom surface of said keyboard module when moved from the first position to the second position.

* * * * *